Aug. 28, 1928.
C. H. SMOOT
1,682,689
APPARATUS FOR REGULATING THE COMPOSITION OF MIXED GASES
Filed Feb. 2, 1927   3 Sheets-Sheet 1
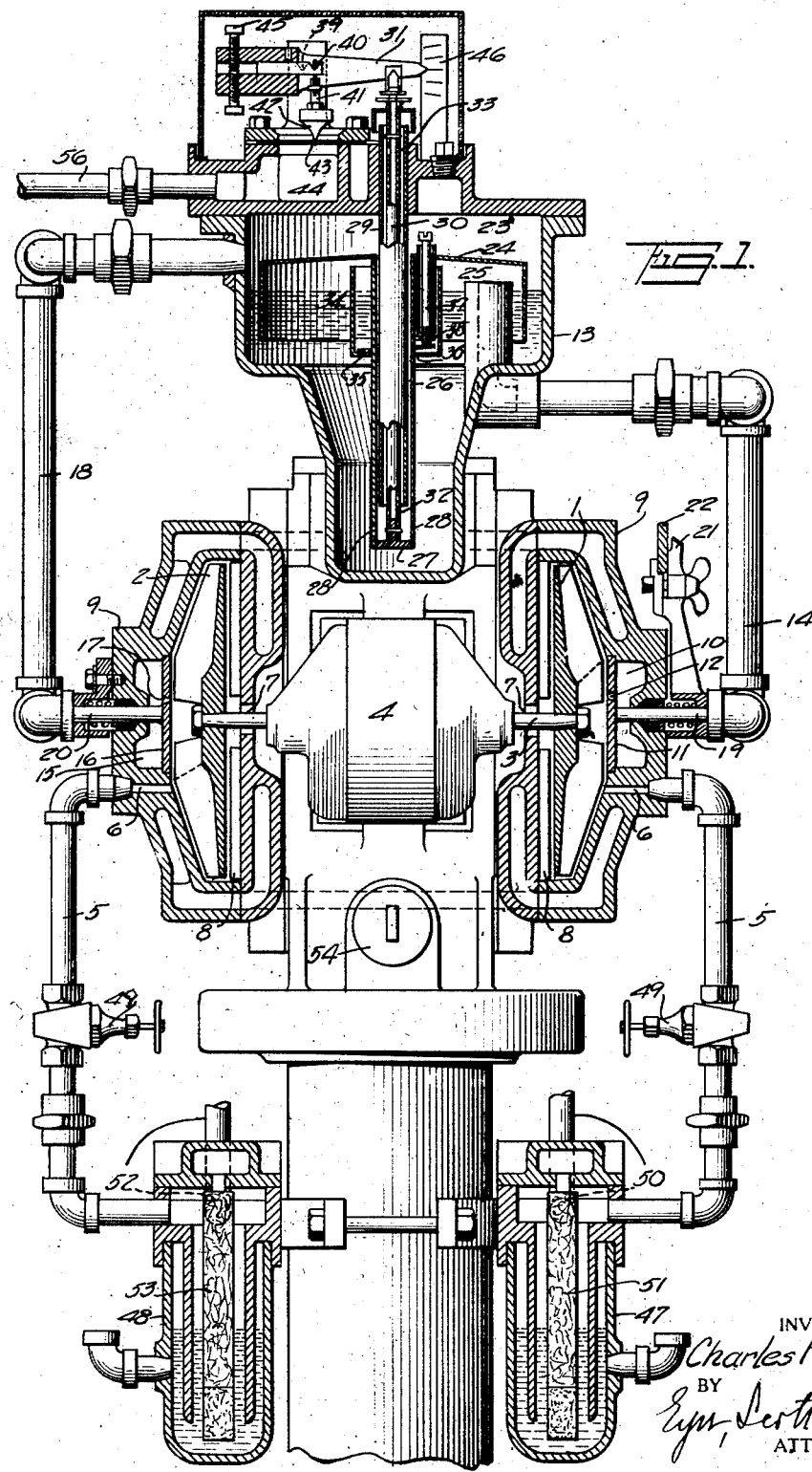
INVENTOR
Charles H. Smoot
BY
ATTORNEYS Aug. 28, 1928.  
C. H. SMOOT  
1,682,689  
APPARATUS FOR REGULATING THE COMPOSITION OF MIXED GASES  
Filed Feb. 2, 1927  
3 Sheets-Sheet 2
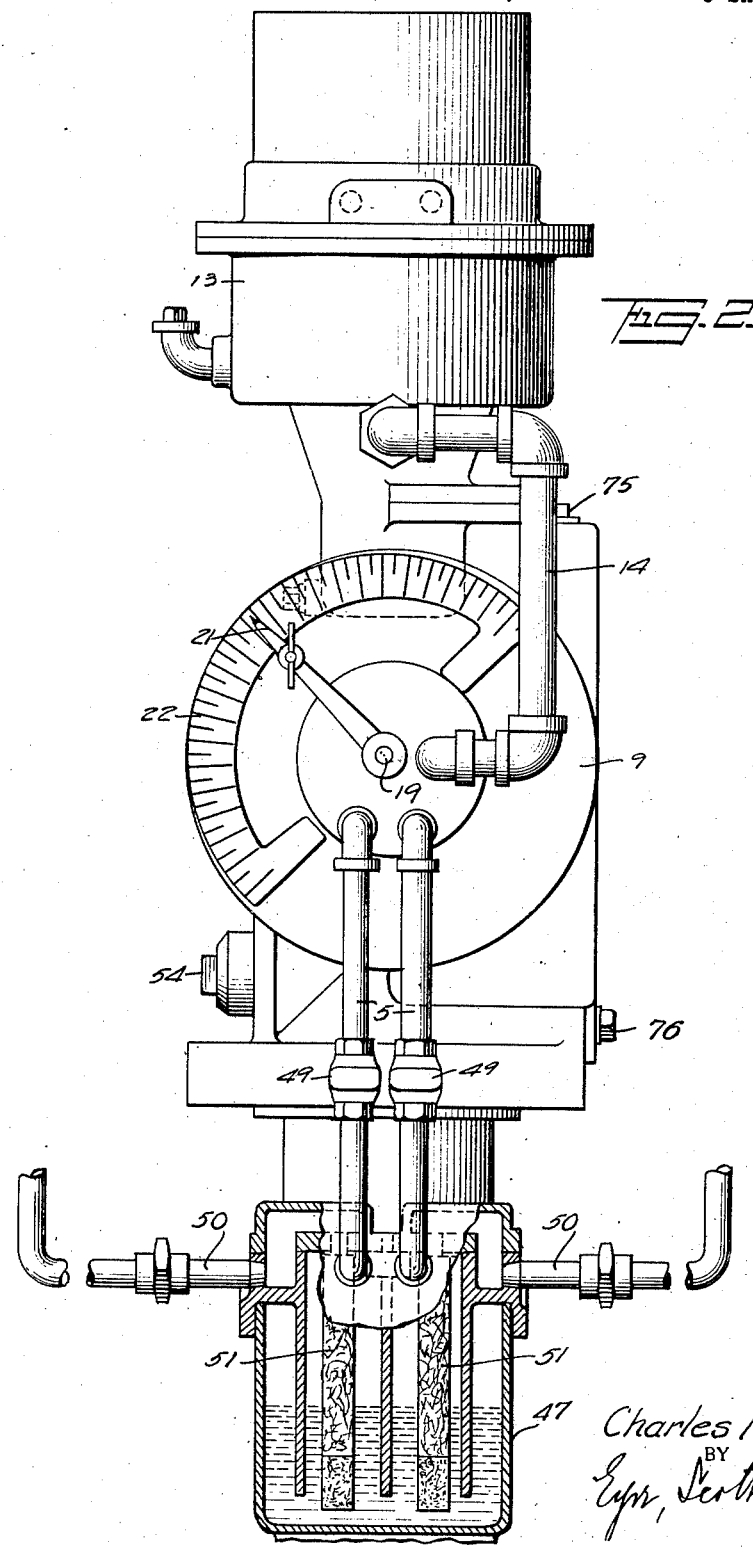
INVENTOR  
Charles H. Smoot.  
BY  
ATTORNEYS

Aug. 28, 1928.
C. H. SMOOT
1,682,689
APPARATUS FOR REGULATING THE COMPOSITION OF MIXED GASES
Filed Feb. 2, 1927    3 Sheets-Sheet 3
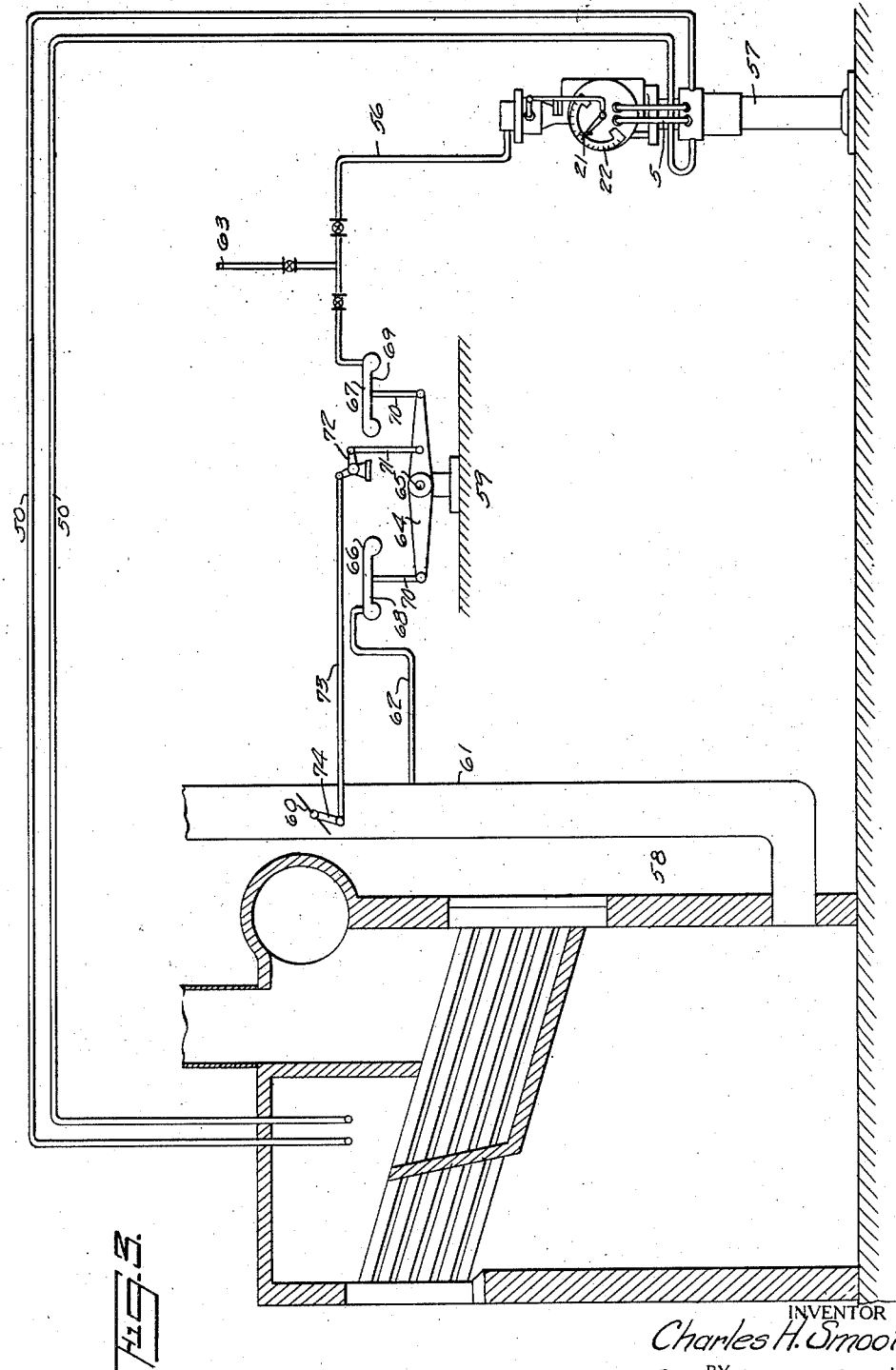
INVENTOR
Charles H. Smoot.
BY
ATTORNEYS Patented Aug. 28, 1928.

1,682,689

UNITED STATES PATENT OFFICE.

CHARLES H. SMOOT, OF MAPLEWOOD, NEW JERSEY.

APPARATUS FOR REGULATING THE COMPOSITION OF MIXED GASES.

Application filed February 2, 1927. Serial No. 165,397.

My invention relates to the regulation of the constituents of a mixed gas and comprises novel apparatus adapted to effect such regulation, which apparatus is automatic in action and sensitive in operation, yet strong, rugged and durable under practical service conditions.

By means of my invention many usual sources of error in what are known as gas density regulators or recorders are eliminated and the necessity for delicate auxiliary apparatus for maintaining constant the volume, temperature or other variable condition of the gas is avoided without loss of accuracy or sensitivity.

My apparatus may be used in the regulation of the composition of any mixed gas to control one constituent thereof in response to changes in density caused by changes in the mixture. It is for example well suited to the regulation of the $CO_2$ content of furnace gas where it may be used to control the ratio of air feed to fuel feed in response to variations in the $CO_2$ content of the furnace or flue gas. The particular application of my apparatus is immaterial, however, as my present invention is not concerned therewith.

My invention involves the production and utilization for the regulation of two pressures, one of which is created by so acting mechanically upon a flow of the gas to be regulated and the other by simultaneously and identically so acting upon the flow of another gas of unchanging composition that the pressures developed at predetermined points in the two flows are equal with a given composition of the gas to be regulated, and become unequal only when the composition of the gas to be regulated varies. Such inequality of pressures is employed to vary the proportion of the constituents of the gas to be regulated.

The principles upon which my apparatus operates will be made clear by the following discussion: Variations in density of samples of mixed gas, the temperatures and volumes of which are equal, indicate differences in the proportions of the various constituents of the gas. A centrifugal fan operating upon a constant quantity of gas and running at constant speed creates a pressure at any point proportional to the square of the radial distance from the axis of the fan to that point and to the density of the gas. Under controlled conditions, therefore, by introducing the mixed gas into a centrifugal fan, the variations in the density of the gas will cause variations in pressure at a selected point and these variations in pressure may be utilized to operate a regulator to maintain constant the proportion of the different constituents of the gas. By utilizing a specially constructed centrifugal fan having a practically flat pressure volume characteristic for very small volumes and by permitting only such small volume of gas to enter the fan as will be within the range of the flat part of this characteristic curve, the necessity for maintaining the gas volume strictly constant is eliminated. I obviate as well the regulation of the fan speed and the temperature of the gas, by balancing the pressure, the variations in which are to affect the regulation of the gas content against another pressure which is not constant but which varies with the fan speed and gas temperature in the same way as does the controlling pressure. This is accomplished by operating two similar fans on the shaft of a single motor, which insures equality of speed, by circulating water or other liquid continuously through interconnected casings of the two fans which insures equality of temperature, and by operating the second fan upon a small volume of air or other constant density gas and utilizing the pressure of the air at some definite radial distance from the axis of this second fan to balance the gas pressure generated by the first fan at a definite radial distance from its axis. Variations between these two pressures are then used to control the gas content in any desired manner.

For a better understanding of my invention and for the advantages pertaining thereto, reference should be had to the accompanying drawings of which Fig. 1 is a vertical section of the preferred form of my apparatus, Fig. 2 is a side view thereof partly in section, and Fig. 3 is a diagrammatic representation of an application of my invention to the control of the $CO_2$ content of the furnace gases.

Referring to Figs. 1 and 2 in which like numerals represent like parts, similar fans 1 and 2 mounted on the shaft 3 of motor 4 receive gas and air respectively through two pipes 5 and two restricted inlets 6. Fig. 1 being a sectional view only shows one pipe 5 and one inlet 6 for each fan. The fans exhaust directly to atmosphere at 7 and radial blades 8 in the casings 9, permitting radial but not circumferential flow of the air or gas before exit from the casing, insure substantially atmospheric pressure at the peripheries of the fans. The fans 1 and 2 are built on the general principles disclosed in my patent No. 1,361,107, granted December 7, 1920, but modified somewhat. A chamber 10 formed by the casing 9 and a disk 11 is in communication by means of the passage 12 with the space within which the fan 1 revolves. The chamber 10 is in communication through pipe 14 with a pressure responsive device 13 hereinafter to be described. Similarly a chamber 15 formed by the casing 9 and disk 16 communicates through passage 17 with the air space of fan 2 and with the device 13 through pipe 18. The disks 11 and 16 are mounted on shafts 19 and 20 respectively which, passing through bushings, extend through the casings 9 and are free to turn therein. The shafts 19 and 20 are parallel to, but slightly out of line with, the shaft 3 upon which the fans are mounted, as a result of which a rotation of the disk 11 or 16 changes the radial distance from the axis of the fan to the passage 12 or 17. To the shaft 19 is fastened one end of a lever arm 21, the other end of which is free to be moved by hand over a dial 22; a relatively large angular movement of the arm 21 resulting in a relatively small radial displacement of the passage 12 with respect to the axis of the fan 1. The casings 9 are double walled and interconnected as indicated by the dashed lines in Fig. 1 and serve as a jacket through which water is continuously circulated. This insures that both fans are at the same temperature. Any suitable openings in the casings 9 may be made for the introduction and withdrawal of the circulating water. In Fig. 2 the reference numerals 75 and 76 indicate such openings, the internal connections between these points and the casings 9 not having been illustrated for convenience.

At 13 is shown a float type pressure balance of novel construction. An enclosed chamber 23 is partially filled with water, light oil or other suitable liquid. A float 24 confines part of the space above the liquid into an annular cylindrical chamber 25 which is in communication with chamber 10 by means of pipe 14. The space above the float is in communication with chamber 15 by means of pipe 18. As shown, the cylindrical float 24 has a central hollow cylindrical portion 26 of relatively small diameter extending into the liquid considerably below the float proper and having an end closure 27. Passages 28 permit liquid to enter the interior of the cylinder 26. A tube 29 supported by the upper wall of the chamber 23, through which it passes, extends into the cylinder 26 and terminates just above the closure 27. The upper end of the tube 29 is open to the atmosphere. A tube 30, passing through the tube 29, is attached at one end to the closure 27 and at the other end to a lever mechanism 31 and serves to transmit vertical motion of the float 24 to the lever 31. The interior of tube 30 is opened at the lower end to the liquid and at the upper end to the atmosphere by passages 32 and 33 respectively.

In the space enclosed by the float 24 is a partially submerged open vessel 34 which is carried by the cylindrical portion 26 and which has a leakage port 36 in its base. A resilient member 35 is interposed between the port 36 and a screw 37, which screw is threaded into a lug 38 carried by the cylinder 26. The leakage permitted through port 36 may thus be varied by the screw 37. When the float moves in either direction a temporary difference in the level of the liquid within and without the vessel 34 occurs which, while present, offers opposition to the further movement of the float. The duration of this difference in liquid level depends upon the leakage through port 36 permitted by screw 37.

The lever 31 rests on a knife edge shown in dotted lines at 39. Supported by the lever 31 and hanging therefrom by a knife edge 40 is a member 41 terminating in a conical tip 42. The tip 42 serves as a leakage valve for a chamber 44 by partially closing a port 43 in the wall thereof, the degree of leakage permitted from chamber 44 thus depending upon the position of the lever 31. A weight 45, preferably capable of both horizontal and vertical adjustment, serves as a counter balance to the forces due to the weights of member 41 and float 24 acting on the lever 31. Any displacement of the lever 31 from its neutral position may be observed by means of a vertical scale 46 located just behind one end of the lever.

Located below the motor 4 and fans 1 and 2 are saturators 47 and 48 through which the gas and air must pass before reaching pipes 5 leading to the fans. Due to the saturation of both the air and gas when passing through the saturators, any variations in moisture content of the atmosphere will not affect the accuracy of the apparatus. Manually adjustable throttling valves 49 in pipes 5 as well as the small size of the inlets 6 insure that the volume of gas or air admitted to the fans is very small relative to the capacity of the fans. In the particular embodiment of my invention illustrated in the drawings, the saturators 47 and 48 are each provided with two inlet pipes, one at the front and one at the rear of each saturator. In Fig. 1 the front inlet pipe for the gas saturator is indicated at 50 and that for the air saturator at 52. In the view in Fig. 2 both pipes 50 and both pipes 5 are visible. The number of the inlet pipes is purely a matter of choice, depending upon how many different samples of gas are needed to insure that the density of the gas received by the fan is the average of that of the gas as a whole.

In operation the pipes 52 are open to the atmosphere and the pipes 50 are connected to the gas, the composition of which is to be regulated. The lever 21 is set to that part of the scale 22 representing the desired composition, the motor 4 is started as by switch 54 and the circulation of water through the casings 9 is begun. In the particular case illustrated the regulation is to be effected by a motive fluid, variations in the pressure of which are to be caused by variations in the leakage through port 43 of chamber 44. The pipe 56, therefore, leads to both a source of motive fluid and an element to be regulated, such as a pressure operated damper in the path of flow of one constituent of the gas. The exact manner, however, in which the variations in pressure within the chamber 44 are made to vary the gaseous density is immaterial to my present invention. The suction of the large capacity fan 1 draws the gas whose composition is to be regulated, through the pipes 50 and water soaked strip 51, where it becomes thoroughly saturated with moisture, into the pipes 5 and through the constricted inlets 6 to the fan chamber. The pressure of the gas at entrance to this chamber is negative and will vary with the density. Upon entrance to the chamber the speed of the fan causes the gas to fill the entire space around the fan and to exert pressures increasing with the square of the radial distance from the axis of the fan to the periphery where the pressure is that of the atmosphere. The static pressure in the chamber 10 is the same as that at the average radial distance of the passage 12 from the axis of the fan 1, and this pressure is transmitted through the gas in pipe 14 to the space enclosed between the float and the liquid in the chamber 23. Similarly air is drawn by the fan 2 through the pipe 52, strip 53, pipes 5 and inlets 6 into the fan chamber, and the pressure at the average radial distance from the axis of this fan to the passage 17 is transmitted to the space above the float in chamber 23. If the density of the gas is that desired, and for which the lever arm 21 has been set, the pressures acting upon the float 24 will be equal and the lever 31 will be in its neutral position. There will be constant leakage through port 43 and whatever device is controlled by the motive fluid in pipe 56 and chamber 44 will not be altered. Should the temperature of the fans increase, or their speed, or both, the balance will not be affected as the pressures within and without the float will change by the same amounts. If, however, the composition of the gas varies so as to increase the density, there will be a greater difference in pressure between the axis of the fan 1 and the periphery inasmuch as the pressure difference varies with the density. As the pressure at the periphery is maintained atmospheric it follows that the absolute value of the pressure in the chamber 10 must decrease with increase in density of the gas. This decrease in pressure results in a downward movement of the float 24 and tube 30, in a rocking of the lever 31 and a consequent decrease in leakage from the chamber 44. Assuming now that the apparatus is regulating the $CO_2$ content of a furnace, the decrease in leakage from chamber 44 will increase the pressure on some auxiliary regulator and cause it to increase the amount of air supplied to the furnace in proportion to the amount of fuel fed thereto to thus reduce the $CO_2$ content and therefore the density of the furnace gas. When the composition of the gas has been returned to the desired value the pressures acting on the float will again be equal. Similarly a decrease in density of the gas causes the pressure beneath the float to increase and results in an upward movement of the float and a greater leakage from the chamber 44 until the density has been returned to the desired value.

When it is desired to regulate to some other value of the density it is only necessary to move the arm 21 to another position on the scale 22 corresponding with the density now desired. When using the apparatus to control combustion the division on the scale 22 could represent percentages of $CO_2$.

The distance between the opening 17 and the axis of the air fan remains unchanged during the operation of the device, although it is possible to vary this latter distance by turning the shaft 20. This is, however, merely a matter of convenience in factory adjustment and is not essential to the operation of the apparatus.

One method of using my apparatus to control the ratio of air to fuel feed in a boiler furnace is shown diagrammatically in Fig. 3 in which the regulator is shown at 57 with the pipes 50 leading into a boiler furnace 58 and terminating in the path of flow of the gases of combustion, and with the pipe 56 leading to a balance device 59 controlling the position of a damper 60 in the air supply line 61. A source of pressure, not shown, is connected by means of pipe 63 with pipe 56 and pipe 62 leads from a point in the conduit 61 beyond the damper 60 to the device 59. The device 59 may be any well known type of pressure balance and may control the damper mechanically or through an auxiliary source of motive fluid. In the particular representation shown, a lever 64, fulcrumed at 65, is acted upon in opposite directions by the pressures within the chambers 66 and 67 exerting forces upon the diaphragms 68 and 69 respectively, which diaphragms are connected to the ends of the lever 64 by means of rods 70 attached thereto. The pipe 62 connects with the chamber 66 and the pipe 56 with chamber 67.

With the arrangement shown in Fig. 3, when the $CO_2$ content of the furnace gas increases, the density of the gas drawn through pipes 50 increases, resulting in a decrease in the leakage permitted from pipe 56 as explained in connection with Figs. 1 and 2. The pressure within the chamber 67 thereby increases sufficiently to move the lever 64 in a clock-wise direction, thus pulling on rod 71 which, through bell crank lever 72, rod 73 and arm 74, moves the damper 60 into a more open position. The opening of the damper permits more air to enter the furnace thus reducing the $CO_2$ content of the gases. Conversely a decrease in $CO_2$ content results in a partial closure of the damper to return the lever 31 (Fig. 1) to neutral position by the return of the $CO_2$ content to the value corresponding to the setting of the arm 21 on the scale 22. The pressure transmitted through pipe 63 may be constant, manually adjusted or automatically controlled in accordance with the steam pressure as desired. The device 59 operates to maintain the pressure of the air supplied to the furnace proportional to the pressure within the chamber 67. When using this apparatus with a system of centralized regulation, such as is described and claimed in my Reissue Patent No. 16,507, granted December 21, 1926, the pipe 63 would lead from a master controller and would transmit master air pressure, adjusted by the gas density regulator to the diaphragm 69, in which case also the stoker (not shown) would be controlled directly from the master controller independently of the device 57.

I have now described and illustrated my invention in the form preferred by me. Obviously many substitutions or omissions of parts could be made without departing from the spirit of my invention. Any suitable type of sensitive pressure balance could be used instead of the device 13, although I prefer the balance device described as it is well suited to accurately regulate when subjected to such pressures as are produced by the apparatus described. It is of course immaterial whether the lever mechanism controls a leakage port, as shown, or any other regulating device, as, for example, an electrical resistance. My apparatus is essentially a regulator and not an indicator of gaseous density. Whenever it is desired, however, to use the apparatus as a meter it is only necessary to determine by trial the position on the scale 22 of the arm 21 which corresponds with the neutral position of the lever 31, this position of the arm 21 then indicates the gaseous density on the scale 22.

Having thus described my invention, what I claim, and desire to protect by Letters Patent is:

1. In a regulator for controlling the composition of mixed gases, means for producing under like conditions two varying pressures, one affected by the density of the gas whose composition is to be regulated, and one unaffected by such density, and means responsive to both of such pressures for regulating the composition of the gas to maintain a definite relation between said pressures.

2. A regulator for controlling the composition of mixed gases, including a fan for creating a pressure, which varies with the density of the gas whose composition is to be controlled, a second fan for creating a pressure independent of said density, means for maintaining the ratio between said pressures independent of the temperature or speed of said fans and means controlled by the differential of said pressures.

3. A regulator for controlling the composition of mixed gases, including a fan for creating at a definite radial distance from its axis a pressure varying with the density of the gas whose composition is to be regulated, a second fan for creating at a definite radial distance from its axis a pressure independent of said density and means for adjusting one of said radial distances.

4. A regulator for controlling the composition of mixed gases including a centrifugal fan rotating in an atmosphere of the gas whose composition is to be regulated, a second centrifugal fan rotating in an atmosphere of a gas whose composition is constant, means for driving both of said fans at the same speed, means for maintaining constant the pressure at the peripheries of said fans and means for balancing the pressure at a definite radial distance from the axis of one fan against that at a definite radial distance from the axis of the second fan.

5. Apparatus as in claim 4 including means for adjusting the radial distance from the axis of one of the said fans.

6. Apparatus as in claim 4 including means for maintaining both of said fans at the same temperature.

7. A regulator for controlling the composition of mixed gases including a centrifugal fan operating upon the gas whose composition is to be regulated and exhausting said gas directly into the atmosphere, a second fan constructed similarly to the first fan and operating upon a gas of constant composition and also exhausting directly into the atmosphere, means for introducing into said fans the gases to be operated upon in only such amounts as to be small compared with the capacity of said fans, a motor driving said fans at the same speed, and means for balancing the pressures generated by said fans at definite radial distances from their axes.

8. A regulator for controlling the composition of mixed gases including two fans and a motor for driving the same, two double-walled inter-connected casings providing enclosed chambers for said fans, a second and smaller chamber within each of said casings adjacent to the fan chamber and separated therefrom by a disk having a passage therethrough, said disk being parallel to but eccentric with said fans and being mounted on a shaft which passes through the walls of the casing, a movably adjustable arm attached to the outer end of one of said shafts, a scale behind the line of travel of the free end of said arm, a pressure responsive device and a pipe leading from each of said small chambers to said pressure responsive device.

9. A regulator for controlling the composition of mixed gases including two fans and a motor for driving the same, double-walled interconnected casings for said fans, permitting a circulation of liquid therethrough, restricted inlets through each of said casings, an enclosed chamber partially filled with liquid, an inverted float member partially submerged in said liquid and dividing the space above the liquid into two portions, a pipe joining the space above said member with the interior of one of said casings at a definite radial distance from the axis of the enclosed fan, a second pipe connecting the space confined by the float member with the interior of the other of said casings at a definite radial distance from the axis of the other fan, and a lever mechanism connected to said float member and a leakage valve controlled by said lever.

10. A regulator for controlling the composition of mixed gases including two saturators, one for the gas whose composition is to be regulated, and one for air, two fans driven at the same speed and enclosed in casings, pipe connections between one of said saturators and the fan chamber within one of said casings, pipe connections between the other one of said saturators and the fan chamber of the other one of said casings, a restriction in each of said pipes, means for exhausting said fans at atmospheric pressure, and means for balancing the gas pressure at a definite radial distance from the axis of one fan against the air pressure at a definite radial distance from the axis of the other fan.

11. In a regulator for controlling the composition of mixed gases, means for producing two varying pressures, one affected by the density of the gas whose composition is to be regulated and one unaffected by such density, pressure responsive means including an inverted float member partially submerged in liquid, movable by the differential of said pressures and having a central cylindrical portion extending into the liquid substantially below the main part of said float, and means for offering temporary opposition to the movement of said float comprising a partially submerged vessel carried by said cylindrical portion and provided with an adjustable leakage port beneath the surface of the contained liquid.

12. In apparatus responsive to variations in the composition of mixed gases, a movable member, means for producing under like conditions two varying pressures, one affected by the density of the mixed gases, and one unaffected by such density, and means responsive to both of such pressures for controlling said movable member to maintain a definite relation between said pressures.

13. In a regulator for controlling a composition of mixed gases means for producing two varying pressures, one affected by the density of the gas whose composition is to be regulated and one unaffected by such density, pressure responsive means acting to regulate the density of the gas being controlled, said pressure responsive means being subjected to the two varying pressures first mentioned and resilient means for checking the motion of the pressure responsive device.

14. In a regulator for controlling a composition of mixed gases means for producing two varying pressures, one affected by the density of the gas whose composition is to be regulated and one unaffected by such density, pressure responsive means acting to regulate the density of the gas being controlled, said pressure responsive means being subjected to the two varying pressures first mentioned, resilient means for checking the motion of the pressure responsive device and means for removing after a lapse of time the effect of the checking means above.

In testimony whereof, I have signed my name to this specification.

CHARLES H. SMOOT.